US010605673B2

(12) United States Patent
Woodard et al.

(10) Patent No.: US 10,605,673 B2
(45) Date of Patent: Mar. 31, 2020

(54) WIRELESS TEMPERATURE SENSOR HAVING NO ELECTRICAL CONNECTIONS

(71) Applicant: UNITED STATES OF AMERICA AS REPRESENTED BY THE ADMINISTRATOR OF NASA, Washington, DC (US)

(72) Inventors: Stanley E. Woodard, Hampton, VA (US); Chuantong Wang, Williamsburg, VA (US); Bryant D. Taylor, Smithfield, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/042,444

(22) Filed: Jul. 23, 2018

(65) Prior Publication Data
US 2018/0348066 A1 Dec. 6, 2018

Related U.S. Application Data

(63) Continuation of application No. 14/193,861, filed on Feb. 28, 2014, now Pat. No. 10,031,031, which is a continuation of application No. 13/029,471, filed on Feb. 17, 2011, now abandoned.

(60) Provisional application No. 61/305,309, filed on Feb. 17, 2010.

(51) Int. Cl.
*G01K 7/38* (2006.01)
*G01K 7/00* (2006.01)
(52) U.S. Cl.
CPC ............................ *G01K 7/38* (2013.01); *G01K 7/00* (2013.01)
(58) Field of Classification Search
CPC combination set(s) only.
See application file for complete search history.

(56) References Cited

U.S. PATENT DOCUMENTS

| | | | |
|---|---|---|---|
| 4,510,484 A | 4/1985 | Snyder | |
| 5,291,180 A | 3/1994 | Reeb | |
| 5,608,417 A | 3/1997 | de Vall | |
| 5,892,425 A | 4/1999 | Kuhn et al. | |
| 5,969,590 A | 10/1999 | Gutierrez | |
| 6,147,606 A | 11/2000 | Duan | |
| 6,194,987 B1 | 2/2001 | Zhou et al. | |
| 6,304,083 B1 | 10/2001 | Owens | |

(Continued)

OTHER PUBLICATIONS

National Highway Traffic Safety Administration, Proposed New Pneumatic Tires for Light Vehicles, FMVSS, No. 139 (2001).

(Continued)

*Primary Examiner* — Natalie Huls
*Assistant Examiner* — Janice M Soto
(74) *Attorney, Agent, or Firm* — Robin W. Edwards; Helen M. Galus

(57) ABSTRACT

A wireless temperature sensor includes an electrical conductor and a material spaced apart from the conductor and located within one or more of the responding electric field and responding magnetic field of the conductor. The conductor is electrically unconnected and is shaped for storage of an electric field and a magnetic field. In the presence of a time-varying magnetic field, the conductor resonates to generate harmonic electric and magnetic field responses, each of which has a frequency associated therewith. The material is selected such that it experiences changes in one of dielectric properties and magnetic permeability properties in the presence of a temperature change. Shifts from the sensor's baseline frequency response indicate that the material has experienced a temperature change.

17 Claims, 4 Drawing Sheets

(56) References Cited

U.S. PATENT DOCUMENTS

| | | | |
|---|---|---|---|
| 6,348,391 | B1 | 2/2002 | Fattaruso |
| 6,444,517 | B1 | 9/2002 | Hsu et al. |
| 6,498,325 | B1 | 12/2002 | Akel et al. |
| 6,573,818 | B1 | 6/2003 | Klemmer et al. |
| 6,611,188 | B2 | 8/2003 | Yeo et al. |
| 6,661,079 | B1 | 12/2003 | Bikulcius |
| 6,696,953 | B2 | 2/2004 | Qiu et al. |
| 6,838,970 | B2 | 1/2005 | Basteres et al. |
| 6,853,079 | B1 | 2/2005 | Hopper et al. |
| 6,860,154 | B2 | 3/2005 | Yamamoto et al. |
| 6,922,126 | B1 | 7/2005 | Okamoto et al. |
| 7,086,593 | B2 | 8/2006 | Woodard et al. |
| 7,134,785 | B2 | 11/2006 | Takashima et al. |
| 7,159,774 | B2 | 1/2007 | Woodard et al. |
| 7,711,509 | B2 | 5/2010 | Woodard et al. |
| 7,902,815 | B2 | 3/2011 | Woodard et al. |
| 8,042,739 | B2 | 10/2011 | Woodard et al. |
| 8,167,204 | B2 | 5/2012 | Woodard et al. |
| 8,673,649 | B2 | 3/2014 | Woodard et al. |
| 2004/0066296 | A1 | 4/2004 | Atherton |
| 2005/0012615 | A1 | 1/2005 | Piccoli et al. |
| 2005/0171703 | A1 | 8/2005 | Goldfine et al. |
| 2007/0181683 | A1 | 8/2007 | Woodard et al. |
| 2008/0184795 | A1* | 8/2008 | Woodard ............ G01R 33/1223 73/304 C |
| 2008/0212646 | A1* | 9/2008 | Azuma .................. G01K 1/024 374/176 |
| 2009/0011922 | A1 | 1/2009 | de Rochemont |
| 2009/0207702 | A1* | 8/2009 | Sato ......................... G11B 5/02 369/13.14 |

OTHER PUBLICATIONS

J. Siddons et al., "Tyre pressure measurement using smart low power microsystems", Sensor Review, vol. 17 (2), 1997, pp. 126-130.

C. Kolle et al., "Ultra Low-Power Monolithically Integrated Capacitive Pressure Sensor for Tire Pressure Monitoring", IEEE, vol. 1, 2004, pp. 244-247.

N. Persson et al., "Low Tire Pressure Warning System Using Sensor Fusion", SAE Conference Proceedings on Automotive and Transportation Technology Congress Exposition, 2001, Barceiona, Spain, pp. 77-79.

N. Persson et al., "Indirect Tire Pressure Monitoring Using Sensor Fusion", Proceedings of SAE 2002 in Detroit, USA, 2002.

A. Pohl et al., "The "Intelligent Tire" Utilizing Passive SAW Sensors-Measurement of Tire Friction", vol. 48 (6), 1999, pp. 1041-1046.

G. Schimetta et al.. "A Wireless Pressure-Measurement System Using a SAW Hybrid Sensor", IEEE Transactions on Microwave Theory and Techniques, vol. 48, No. 12, Dec. 2000.

Technical Research Centre of Finland (VTT), Final Report including technical implementation Plan (Annex), APOLLO IST-2001-34372, Intelligent Tyre for Accident-free Traffic, Deliverable, 2001. Development of an intelligent Tire-experiences from the Apollo project, Intelligent Tire Technology Conference, Nov. 29-30, in Frankfurt am Main. Germany, 2005.

M. Matsuzaki et al., "Wireless Strain Monitoring of Tires using Electrical Capacitance changes with an Oscillating Circuit", Sensors and Actuators A vol. 119, 2005, pp. 323-331.

M. Sergio et al., "On a road tire deformation measurement system using a capacitive-resistive sensor", Smart Materials and Structures, vol. 15, 2006, pp. 1700-1706.

S. Woodard et al., "Magnetic Field Response Measurement Acquisition System", NASA/TM-2005-213518.

S. Woodard et al., "Measurement of Multiple Unrelated Physical Quantities using a Single Magnetic Field Response Sensor", Measurement Science and Technology, vol. 18, 2007, pp. 1603-1613.

Ya Wang et al., "A Passive Wireless Temperature Sensor for Harsh Environment Applications", Sensors 2008, 8,7982-7995.

G. Schimetta et al., "Wireless Pressure and Temperature Measurement Using a SAW Hybrid Sensor", 2000 IEEE Ultrasonics Symposium, pp. 445-448.

* cited by examiner (a)

(b)

WIRELESS TEMPERATURE SENSOR HAVING NO ELECTRICAL CONNECTIONS

CROSS REFERENCE TO RELATED APPLICATIONS

This application is a continuation of U.S. patent application Ser. No. 14/193,861 filed on Feb. 28, 2014, which claims the benefit of and priority to U.S. patent application Ser. No. 13/029,471, filed on Feb. 17, 2011, which claims the benefit of priority to U.S. Provisional Patent Application No. 61/305,309, filed Feb. 17, 2010. The contents of each of the foregoing applications are hereby incorporated by reference in their entireties.

ORIGIN OF THE INVENTION

This invention was made in part by an employee of the United States Government and may be manufactured and used by or for the Government of the United States of America for governmental purposes without the payment of any royalties thereon or therefor.

BACKGROUND OF THE INVENTION

Field of the Invention

This invention relates to temperature sensors. More specifically, the invention is a wireless temperature sensor that includes a material whose dielectric or magnetic permeability attributes change with temperature to thereby change a harmonic response of a nearby electrically-unconnected geometric pattern chat is electrically conductive.

Description of the Related Art

Well-known temperature sensors include thermocouples, thermistors, transistors with integrated circuits, and optics-based sensors. All of these sensors require connection with or to electrical circuit systems that provide power and/or control data acquisition. None of these systems can operate after sustaining damage that breaks an electrical line or connection point.

Current wireless temperature sensors and sensor system are designed to be integrated systems that include a sensing element, a power source, a transmitter, a receiver, sending and receiving antenna, and a controller. System life is limited by the power source. Further, the number of elements required for current wireless temperature sensing systems limits applications to those having enough room and generally precludes applications that could make use of an embedded temperature sensor. Still further, the sensing element is part of an electrically closed circuit with electrical connections being required to close the circuit. If a circuit connection or the closed circuit is broken, the sensor system is rendered useless and must be repaired.

SUMMARY OF THE INVENTION

Accordingly, it is an object of the present invention to provide a wireless temperature sensor and sensing system.

Another object of the present invention is to provide a wireless temperature sensor and method for using same.

Still another object, of the present invention is to provide a wireless temperature sensor that can continue to function after sustaining damage.

Yet another object of the present invention is to provide a wireless temperature sensor readily adapted to a variety of installation configurations to include those requiring the sensor to be embedded in a structure.

Other objects and advantages of the present invention will become more obvious hereinafter in the specification and drawings.

In accordance with the present invention, a wireless temperature sensor includes an electrical conductor and a material in proximity to the conductor. The conductor has first and second ends and shaped therebetween for storage of an electric field and a magnetic field. The first and second ends remain electrically unconnected such that the conductor so-shaped defines an unconnected open-circuit having inductance and capacitance. In the presence of a time-varying magnetic field, the conductor so-shaped resonates to generate harmonic electric and magnetic field responses, each of which has a frequency associated therewith. The material is selected such that it experiences changes in either dielectric or magnetic permeability attributes in the presence of a temperature change. Shifts from the sensor's baseline frequency response indicate that the material has been exposed to a change in temperature.

DETAILED DESCRIPTION OF THE INVENTION

Figure 1:
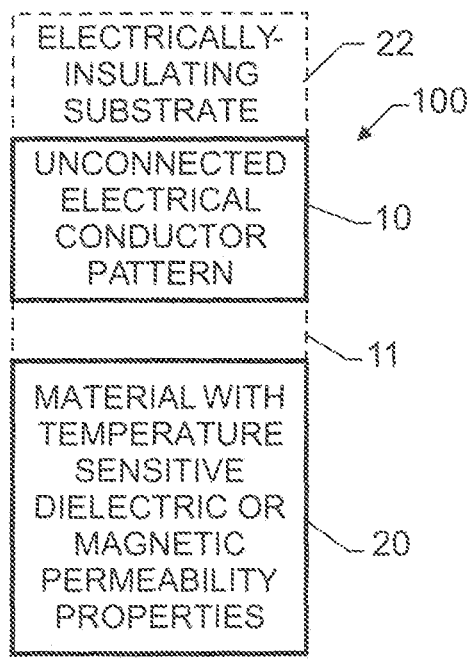
FIG. 1 is a schematic view of a wireless temperature sensor in accordance with an embodiment of the present invention.

Referring now to the drawings and more particularly to FIG. 1, a wireless temperature sensor in accordance with an embodiment of the present invention is shown and is referenced generally by numeral 100. Sensor 100 is constructed to be sensitive to local environmental temperature changes. In the illustrated embodiment, sensor 100 includes an unconnected electrical pattern 10 and a material 20 in proximity to pattern 10.

In general, material 20 is selected to be a material whose dielectric properties or magnetic permeability properties are altered (e.g., dielectric constant or magnetic permeability, respectively, increases or decreases) when in the presence of local temperature changes. As will be explained further below, material 20 must be within the responding electric field of pattern 10 if material 20 is a temperature sensitive dielectric material. If material 20 is a material whose magnetic permeability is temperature sensitive, it must be within the responding magnetic field of pattern 10. Material 20 is a solid material that can be, but need not be, in physical contact with pattern 10. Thus, in general, material 20 must be in proximity to pattern 10. As used herein, the term "proximity" includes the situations where material 20 is near pattern 10 or in contact with pattern 10 as indicated by dashed lines 11. In either case, material 20 will overlap or overlay at least a portion of pattern 10. For the purpose of describing sensor 100, it will be assumed that material 20 is one whose dielectric properties change with temperature, e.g., piezoceramics, glass, etc. However, it is to be understood that the present invention can also be implemented using a material 20 whose magnetic permeability properties change with temperature.

As will be explained further below, it is the temperature-induced change in dielectric (or magnetic permeability) attributes of material 20 that allows sensor 100 to be sensitive to temperature changes. Material 20 is placed in proximity to pattern 10, e.g., deposited on pattern 10 where it can also serve as a substrate/support of pattern 10 such that sensor 100 can be mounted where it is needed, encasing pattern 10, or spaced a short distance away from pattern 10. Material 20 could be in the form of a thin, flexible coating or sheet on pattern 10, a thicker sheet in support of or positioned near pattern 10, or even a thin strip overlaying some region of pattern 10.

Electrical conductor pattern 10 is any electrical conductor (e.g., wire, run, thin-film trace, etc.) that can be shaped to form an open-circuit pattern that can store an electric field and a magnetic field. The term "open-circuit pattern" as used herein means that the conductor has two ends that are electrically unconnected with the resulting conductor pattern being an electrical open circuit having inductance and capacitance attributes.

Pattern 10 can be a stand-alone electrically-conductive run or wire requiring no physical support to sustain its shape. Pattern 10 can also be made from an electrically-conductive run or thin-film trace that can be deposited directly onto material 20, or on/in an optional substrate material 22 (referenced by dashed lines to indicate the optional nature thereof) that is electrically insulating and non-conductive. The particular choice of the substrate material will vary depending on how it is to be attached to material 20 or otherwise mounted in its desired location. Although not a requirement of the present invention, the surface on which pattern 10 is deposited is typically a planar surface. Because no electrical connections are used, there is no point on pattern 10 that, if damaged, renders the sensor non-functional. As will be explained further below, damage to pattern 10 simply shifts the sensor's frequency range allowing it to continue measurement while damaged.

Techniques used to couple pattern 10 and material 20 are as simple as placing them in non-contacting fixed proximity to each other or physically attaching them together. Pattern 10 can be deposited onto a supporting substrate made of material 20 using any conventional metal-conductor deposition process to include thin-film fabrication techniques. When both pattern 10 and material 20 (as well as any optional substrate material 22) comprise relatively thin flexible elements, sensor 100 forms a flexible device suitable for mounting on a variety of structures located in a region being monitored for a temperature changes. As will be explained further below, pattern 10 can be constructed to have a uniform or non-uniform width, and/or uniform or non-uniform spacing between adjacent portions of the pattern's runs/traces.

Figure 2:
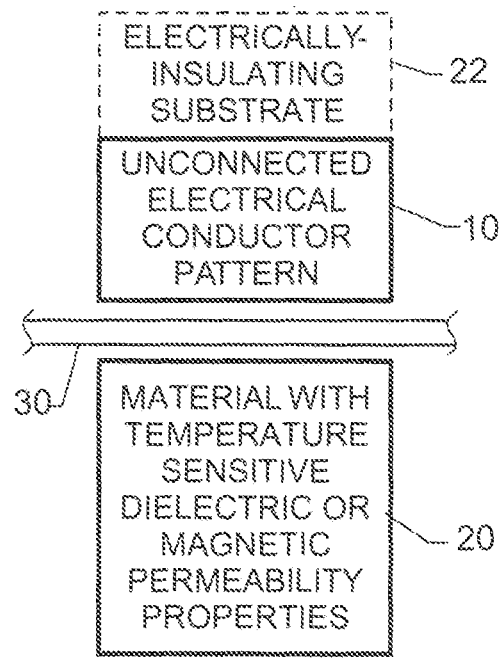
FIG. 2 is a schematic view of a wireless temperature sensor in accordance with another embodiment of the present invention.

The present invention is not limited to the various constructions described above. Accordingly, FIG. 2 depicts another embodiment where material 20 is placed on one side of a thermally and electrically insulating barrier 30 and pattern 10 is placed on the other side of barrier 30. This construction can be used when temperature measurements must be taken in hazardous, harsh, high temperature, caustic, etc., environments, or in the presence of combustible material without any electrical component of the measurement system being exposed to the harsh condition. The separation of pattern 10 from any hazardous or combustible material/environment reduces the potential of dangerous events. Thus, only material 20 needs to be resilient to the harsh environments.

The basic features of pattern 10 and the principles of operation for sensor 100 will be explained for a spiral-shaped conductor pattern. However, it is to be understood that the present invention could be practiced using other geometrically-patterned conductors provided the pattern has the attributes described herein. The basic features of a spiral-shaped conductor that can function as pattern 10 are described in detail in U.S. Patent Publication. No. 2007/0181683, the contents of which are hereby incorporated by reference in their entirety. For purpose of a complete description of the present invention, the relevant portions of this publication will be repeated herein.

As is well known and accepted in the art, a spiral inductor is ideally constructed/configured to minimize parasitic capacitance so as not to influence other electrical components that will be electrically coupled thereto. This is typically achieved by increasing the spacing between adjacent conductive portions or runs of the conductive spiral pattern. However, in the present invention, pattern 10 exploits parasitic capacitance. The capacitance of pattern 10 is operatively coupled with the pattern's inductance such that magnetic and electrical energy can be stored and exchanged by the pattern. Since other geometric patterns of a conductor could also provide such a magnetic/electrical energy storage and exchange, it is to be understood that the present invention could be realized using any such geometrically-patterned conductor and is not limited to a spiral-shaped pattern.

The amount of inductance along any portion of a conductive run of pattern 10 is directly related to the length thereof and inversely related to the width thereof. The amount of capacitance between portions of parallel conductive runs of pattern 10 is directly related to the length by which the runs overlap each other and is inversely related to the spacing between the adjacent conductive runs. The amount of resistance along any portion of a conductive run of pattern 10 is directly related to the length and inversely related to the width of the portion. Total capacitance, total inductance and total resistance for a spiral pattern are determined simply by adding the effective contributions due to individual segments of the pattern. For example, the effective inductance contribution of a trace segment is the resultant change in the total inductance of pattern 10 due to the changes in the pattern's distributed self-inductance and distributed mutual inductance due to the addition of the segment. The effective capacitance contribution of a trace segment is the resulting change in the capacitance of pattern 10 due to the addition of the trace segment as a result of the charge in the segment creating electric fields with the charges in other parts of pattern 10 thus increasing the total distributed capacitance. The geometries of the various portions of the conductive runs of the pattern can be used to define the pattern's resonant frequency.

Pattern 10 with its inductance operatively coupled to its capacitance defines a magnetic field response sensor. In the presence of a time-varying magnetic field, pattern 10 electrically oscillates at a resonant frequency that is dependent upon the capacitance and inductance of pattern 10. This oscillation occurs as the energy is harmonically transferred between the inductive portion of pattern 10 (as magnetic energy) and the capacitive portion of pattern 10 (as electrical energy). That is, when excited by a time-varying magnetic field, pattern 10 resonates a harmonic electric field and a harmonic magnetic field with each field being defined by a frequency, amplitude, and bandwidth.

Figure 3:
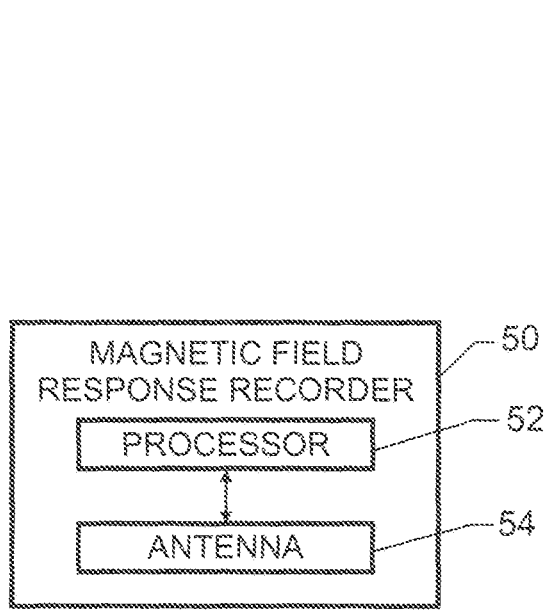
FIG. 3 is a schematic view of a magnetic field response recorder used in an embodiment of the present invention.

The application of a time-varying magnetic field to pattern 10 as well as the reading of the induced harmonic response at a resonant frequency can be accomplished by a magnetic field response recorder. The operating principles and construction details of such a recorder are provided in U.S. Pat. Nos. 7,086,593 and 7,159,774, the contents of which are hereby incorporated by reference in their entirety. Briefly, as shown in FIG. 3, a magnetic field response recorder 50 includes a processor 52 and a broadband radio frequency (RF) antenna 54 capable of transmitting and receiving RF energy. Processor 52 includes algorithms embodied in software for controlling antenna 54 and for analyzing the RF signals received from the magnetic field response sensor defined by pattern 10. On the transmission side, processor 52 modulates an input signal that is then supplied to antenna 54 so that antenna 54 produces either a broadband time-varying magnetic field or a single harmonic field. On the reception side, antenna 54 receives harmonic magnetic responses produced by pattern 10. Antenna 54 can be realized by two separate antennas or a single antenna that is switched between transmission and reception.

In operation, when pattern 10 is exposed to a time-varying magnetic field (e.g., as generated by recorder 50), pattern 10 resonates harmonic electric and magnetic fields. The generated magnetic field is generally spatially larger that the generated electric field. For the illustrated embodiment where material 20 is one whose dielectric properties change with temperature, material 20 is positioned relative to pattern 10 such that it will lie within the generated electric field. However, if material 20 is one whose magnetic permeability properties change with temperature (e.g., manganese copper, nickel zinc, manganese zinc, etc.), material 20 is positioned relative to pattern 10 such that it will lie within the generated magnetic field. By way of example, the operation of sensor 100 will be described relative to the generated magnetic field emanating from pattern 10 when it is exposed to a time-varying magnetic field.

For fixed excitation conditions, the magnetic field response frequency of pattern 10 is dependent upon the dielectric attributes of any dielectric material placed within the electric field resonated by pattern 10. That is, when a material having dielectric properties (e.g., material 20) is placed inside the generated electric field of pattern 10, the frequency response associated with the generated magnetic and electric fields around pattern 10 are affected. More specifically, in the time-varying electric field, dielectric material 20 is polarized such that each molecule acts as an electric dipole moment. The polarization of the dielectric material is a function of the electric field, the dielectric properties of the material, and ambient temperature. Briefly, the electric field polarizes the dielectric material and the polarization can be modulated by ambient temperature. Temperature changes cause a change in the equivalent capacitance value of pattern 10 thereby changing the resonant frequency of pattern 10. Accordingly, if the relative positions of pattern 10 and material 20 remain fixed and if the dielectric properties of material 20 are fixed, then the magnetic field frequency response of sensor 100 remains unchanged for fixed excitation conditions. These fixed conditions and resulting magnetic field frequency response of sensor 100 define a baseline response for sensor 100 that is recorded prior to using sensor 100.

In the illustrated example, material 20 is a dielectric material that will experience a change in its dielectric attributes in the presence of a temperature change. Accordingly, the response frequency of sensor 100 is recorded in conditions where the temperature is stable for a plurality of temperatures. The recorded correlation of temperature and response frequency is calibration data that is stored in response recorder 50. Then, in an unknown temperature environment, the magnetic field frequency response of sensor 100 can be used to measure the temperature-of-interest. Once temperature/response frequency correlation of sensor 100 is known and sensor 100 is placed in use, interrogation/monitoring of sensor 100 can be carried out continuously, periodically, on-demand, etc., without departing from the scope of the present invention.

Figure 4:
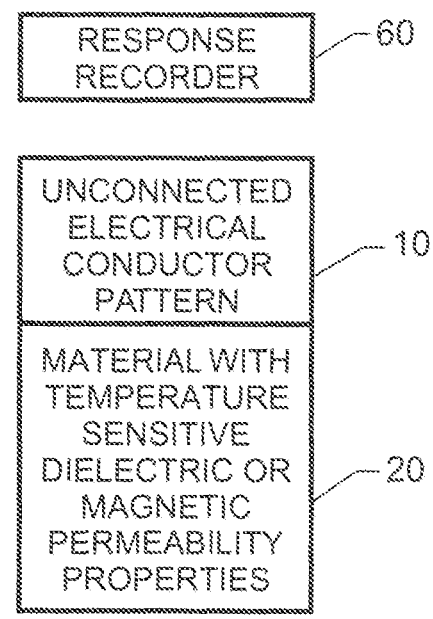
FIG. 4 is a schematic view of a wireless temperature sensor to include a field response recorder in accordance with another embodiment of the present invention.

As mentioned above, a magnetic field response recorder can be used to supply the time-varying magnetic field used to excite pattern 10 and to read/record the generated magnetic field provided by pattern 10. However, the present invention is not so limited since the excitation time-varying magnetic field also causes an electric field to be produced by pattern 10. That is, since material 20 is positioned to lie within the electric field response of pattern 10, the electric field response could also (or alternatively) be monitored. Accordingly, FIG. 4 illustrates another embodiment of the present invention where pattern 10 of sensor 100 is excited and monitored by a field response recorder 60. Recorder 60 transmits the excitation magnetic field to pattern 10 and monitors one or both of the generated magnetic and electric field responses of pattern 10. In accordance with the present invention, recorder 60 monitors the frequency of one or both the magnetic and electric field responses.

Figure 5:
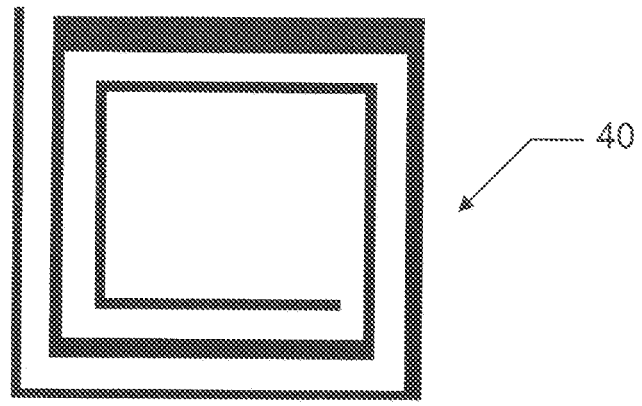
FIG. 5 is a schematic view of a spiral trace conductor pattern whose traces are non-uniform in width.
Figure 6:
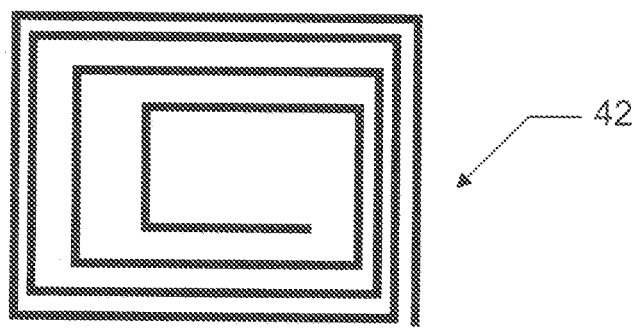
FIG. 6 is a schematic view of a spiral trace conductor pattern having non-uniform spacing between the traces thereof.
Figure 7:
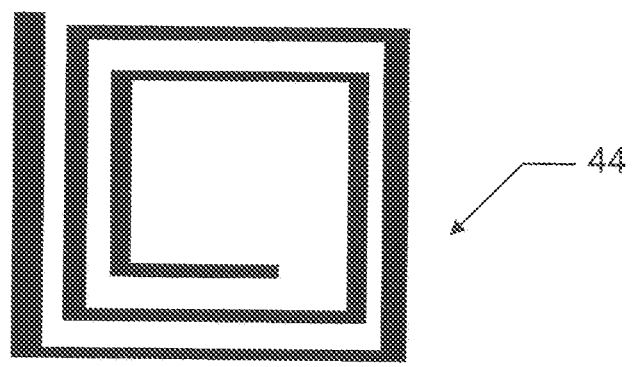
FIG. 7 is a schematic view of a spiral trace conductor pattern having non-uniform trace width and non-uniform trace spacing.

Also as mentioned above, both the width of the pattern's conductive runs/traces and the spacing between adjacent portions of the conductive runs/traces can be uniform. However, the present invention is not so limited. For example, FIG. 5 illustrates a spiral pattern 40 in which the width of the conductive trace is non-uniform while the spacing between adjacent portions of the conductive trace is uniform. FIG. 6 illustrates a spiral pattern 42 in which the width of the conductive trace is uniform, but the spacing between adjacent portions of the conductive trace is non-uniform. Finally, FIG. 7 illustrates a spiral pattern 44 having both a non-uniform width conductive trace and non-uniform spacing between adjacent portions of the conductive trace.

Figure 8:
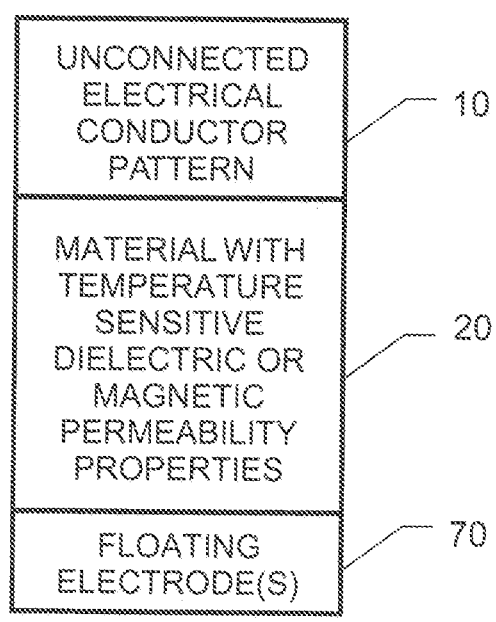
FIG. 8 is a schematic view of a wireless temperature sensor of the present invention incorporated with a wireless electrical device.

The wireless temperature sensor of the present invention can be configured in other ways than described above without departing from the scope of the present invention. The temperature sensor of the present invention could also be incorporated in other wireless devices without departing from the scope of the present invention. For example, FIG. 8 illustrates a wireless electrical device that incorporates the present invention by placing material 20 between pattern 10 and one or more floating electrodes 70. In this embodiment, pattern 10 and floating electrode(s) 70 define a wireless electrical device such as that described in U.S. patent publication number 2010/0109818, the contents of which are hereby incorporated by reference in their entirety.

As another example, the temperature sensor of the present invention could be incorporated in a wireless device, such as that described in U.S. patent publication number 2009/0072814 A1, the contents of which are hereby incorporated by reference in their entirety, to result in a sensor capable of measuring rotation (or displacement speed) and temperature. Sample measureable response mechanisms and respective response parameters are summarized in Table 1.

TABLE 1

Sensor function list

| Measured Parameters | Response Mechanism | Response parameter |
| --- | --- | --- |
| Temperature | Temperature sensitive dielectric responding to electric field or temperature sensitive magnetic permeable material responding to magnetic field | Quasi-static resonant frequency change |
| Damage (Puncture, Split, Deformation) | Conductive pattern change | Abrubt resonant frequency change |
| Motion (Displacement, Rotation, Position) | Energy received by sensor changes | Amplitude change |

As yet another example, the temperature sensor of the present invention could be incorporated in a wireless device, such as that described in U.S. patent publication number 2009/0302111, the contents of which are hereby incorporated by reference in their entirety, to result in a sensor that can concurrently measure temperature and tampering.

As mentioned above, material 20 could also be one whose magnetic permeability properties change with temperature. The above-described methods and principles apply equally to this embodiment. An added advantage of this embodiment is that the larger spatial extent of the magnetic field generated by pattern 10 would allow a "magnetic permeability-based" material 20 to be located further from pattern 10 than a "dielectric-based" material 20.

Regardless of whether material 20 is dielectric-based or magnetic permeability-based, the temperature sensor of the present invention will be able to perform its function even if its conducting pattern 10 is broken or damaged such that the pattern is divided into two or more open circuit patterns. To insure such continued performance, a uniform distribution of material 20 should cover the physical area of pattern 10. Any damage or deformation of pattern 10 will change the sensor's geometric parameters and consequently changes the equivalent inductance and capacitance. Therefore, the sensor shifts its resonant frequency on each damage event. In most cases, the sensor will remain a resonant circuit and respond, to a time-varying magnetic field. The sensor will also maintain its temperature sensing function as long as material 20 remains in proximity to damaged pattern 10. Since sensor damage changes the sensor's parameters immediately, the sensor response to damage is an abrupt increase in its resonant frequency while the sensor response to temperature is a continuous and slow process. Therefore, this sudden shift in frequency allows the sensor to be self-sensing to damage. Any sensor response to a damage event can be taken as a frequency baseline shifting in temperature response. As described in U.S. Patent Publication No. 2009/0109005, the contents of which are hereby incorporated by reference on their entirety, when pattern 10 is broken/damaged to form multiple patterns, the resulting patterns will be inductively coupled to one another such that a new (damaged) sensor is essentially formed that will operate in a new frequency band. Thus, even if damaged, the sensor of the present invention simply shifts its frequency band while retaining its temperature sensing function.

Figure 9:
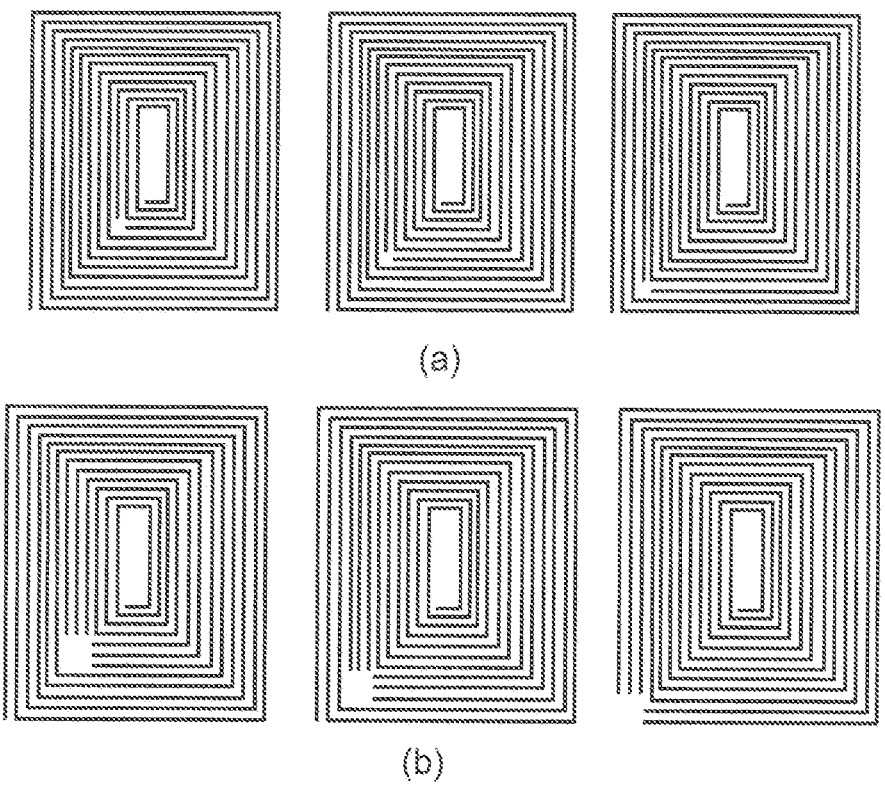
FIG. 9 illustrates example damage sequences for puncture to a spiral trace.
Figure 10:
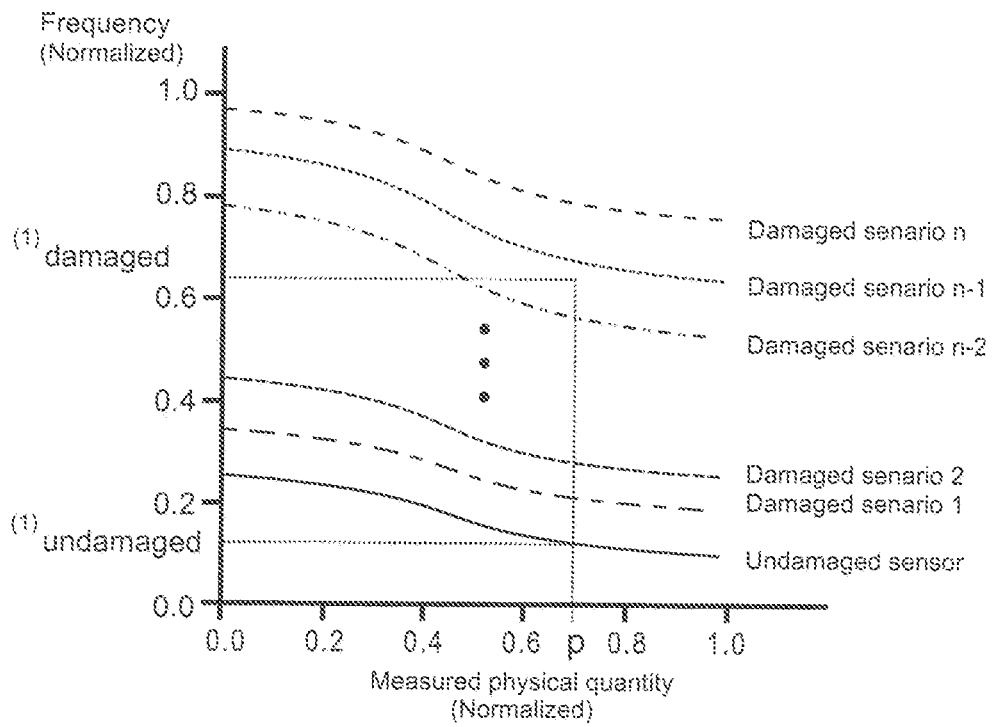
FIG. 10 shows normalized calibration curves for damage scenarios.

In order for a damaged temperature sensor to continue to function, the sensor needs to be calibrated to define response curves for a number of possible and orderly damage scenarios. Then, when an actual sensor damage occurs, the actual response can be compared to the calibration curves and used to interpolate a new calibration curve commensurate with the actual damage as described in. U.S. Patent Publication No. 2008/0243418, the contents of which are hereby incorporated by reference in their entirety. An approach to accommodate measurement after the sensor has been damaged is to develop a library of the measureand-frequency response curves under a large variety of different damage scenarios, such as those shown in FIG. 9. The measurand in this case is temperature. For example, the puncture to a single trace on each sensor is progressively moved away from the initial inside location on the first sensor to the outer position on the last sensor, as shown in FIG. 9a. A similar sequence of damage is repeated as shown in FIG. 9b, except the puncture width is that of two traces. The damage scenarios result in a series of response curves, such as the normalized calibration curves illustrated in FIG. 10. Each damaged sensor has its own unique response curve. A uniform distribution of dielectric material covering the physical area of the sensor should be used. The result will be a functioning sensor whose response can be interpreted but may have a higher measurement error. In a continuous monitoring process, the measurand (e.g., temperature) value is known before the moment of damage. After the damage moment, sensor response frequency jumps to a new point. By using the new response frequency and temperature (temperature is taken as the same before damage event), one can locate the point on the frequency-temperature surface of the database and find the closest two curves. These two curves can be used to create an approximate calibration curve for the damaged sensor, permitting damaged sensors to be used for further measurement of temperature.

The advantages of the present invention are numerous. The wireless temperature sensor requires only a simple unconnected, open-circuit conductor shaped to store electric and magnetic fields, and a material that experiences a change in its dielectric or magnetic permeability attributes in the presence of a temperature change. The chosen material can also serve as a substrate or encasement for "packaging" purposes to thereby form a prefabricated or "in situ" wireless temperature sensor. The wireless temperature sensor requires no electrically connected components, is simple to produce, and can be excited/powered using known field response recorder technology. The shaped conductor can be protected by the chosen material in a potentially harsh environment. No power source or other electrical circuit needs to be connected to the sensor and the sensor will continue to function even if damaged. The present invention is further described in Stanley E. Woodard et al 2010 *Meas. Sci. Technol.* 21 075201, the contents of which are hereby incorporated by reference in their entirety.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A wireless temperature sensor for measuring a local environment temperature of interest, comprising:
    a first element consisting of an electrical conductor having first and second ends and shaped between said first and second ends for storage of an electric field and a magnetic field, said first and second ends remaining electrically unconnected such that said electrical conductor so-shaped defines an unconnected open-circuit having inductance and capacitance wherein, in the presence of a time-varying magnetic field, said electrical conductor so-shaped resonates to generate harmonic electric and magnetic field responses, each of which has a frequency associated therewith;
    a second element consisting of a solid material in proximity to and overlapping at least a portion of said first element and located within said magnetic field responses of said conductor of said first element, wherein said first element and said second element are comprised within said sensor and are distinct from said local environment of interest and wherein said solid material is selected to experience changes in magnetic permeability properties in the presence of a temperature change in said solid material;
    wherein said temperature change in said solid material results from exposure to a change in said local environment temperature of interest; and
    a magnetic field response recorder for recording a baseline frequency response for said magnetic field responses so-generated when temperature of said solid material is not changing and monitoring said magnetic field responses so-generated for changes in frequency with respect to said baseline frequency response as an indication of a change in local environment temperature of interest.

2. A wireless temperature sensor as in claim 1, wherein said electrical conductor comprises a thin-film trace.

3. A wireless temperature sensor as in claim 1, wherein said solid material comprises a magnetic material selected from the group consisting of manganese copper, nickel zinc and manganese zinc.

4. A wireless temperature sensor as in claim 1, wherein said electrical conductor and said solid material are flexible.

5. A wireless temperature sensor as in claim 1, wherein said magnetic field response recorder wireless transmits said time-varying magnetic field to said electrical conductor and wirelessly detects said frequency associated with said magnetic field responses so generated and resulting from said changes in magnetic field permeability properties.

6. A wireless temperature sensor as in claim 1, further comprising an electrically insulating barrier spaced apart from and between said electrical conductor and said solid material.

7. A wireless temperature sensor as in claim 1, wherein said solid material is in contact with said first element.

8. A wireless temperature sensor as in claim 1, wherein said solid material is not in contact with said first element.

9. A wireless temperature sensor for measuring a local environment temperature of interest, comprising:
    a first element consisting of an electrically-insulating substrate;
    a second element consisting of an open-circuit pattern of electrically-conductive material on a face of said substrate, said pattern having two electrically unconnected ends, said pattern shaped for storage of an electric field and a magnetic field, said pattern having inductance and capacitance that allows said pattern to generate harmonic electric and magnetic field responses when in the presence of a time-varying magnetic field, each of said electric and magnetic field responses having a frequency associated therewith;
    a third element consisting of a solid material in proximity to and overlapping at least a portion of said second element and located within said magnetic field responses of said pattern, wherein said solid material is distinct from said local environment of interest and wherein said solid material is selected to experience changes in magnetic permeability properties in the presence of a temperature change in said solid material;
    wherein said temperature change in said solid material results from exposure to a change in said local environment temperature of interest; and
    a magnetic field response recorder for recording a baseline frequency response for said magnetic field responses so-generated when temperature of said solid material is not changing and monitoring said magnetic field responses so-generated for changes in frequency with respect to said baseline frequency response as an indication of a change in local environment temperature of interest.

10. A wireless temperature sensor as in claim 9, wherein said substrate is flexible.

11. A wireless temperature sensor as in claim 9, wherein said face is planar and wherein said pattern is a spiral trace.

12. A wireless temperature sensor as in claim 9, wherein said solid material comprises a magnetic material selected from the group consisting of manganese copper, nickel zinc and manganese zinc.

13. A wireless temperature sensor as in claim 9, wherein said pattern and said solid material are flexible.

14. A wireless temperature sensor as in claim 9, further comprising an electrically insulating barrier spaced apart from and between said electrical conductor and said solid material.

15. A wireless temperature sensor as in claim 9, wherein said magnetic field response recorder wireless transmits said time-varying magnetic field to said electrical conductor and wirelessly detects said frequency associated with said magnetic field responses so generated and resulting from said changes in magnetic field permeability properties.

16. A wireless temperature sensor as in claim 9, wherein said solid material is in contact with said second element.

17. A wireless temperature sensor as in claim 9, wherein said solid material is not in contact with said second element.

* * * * *